United States Patent [19]

Knöpfel

[11] Patent Number: 5,575,460
[45] Date of Patent: Nov. 19, 1996

[54] SPRING CORE FOR A MATTRESS

[75] Inventor: Hans Knöpfel, Roggwil, Switzerland

[73] Assignee: Spuehl AG, Switzerland

[21] Appl. No.: 370,430

[22] Filed: Jan. 9, 1995

[51] Int. Cl.⁶ ........................................... F16F 3/04
[52] U.S. Cl. ..................... 267/91; 5/248; 5/257; 267/101
[58] Field of Search .................. 267/91, 88, 100, 267/95, 101, 92; 5/248, 256, 257, 258

[56] References Cited

U.S. PATENT DOCUMENTS

| | | | |
|---|---|---|---|
| 2,972,154 | 2/1961 | Raszinski | 267/100 |
| 3,064,280 | 11/1962 | Nachman, Jr. | 267/91 |
| 3,754,744 | 8/1973 | Ciampa et al. | 267/101 |
| 4,609,186 | 9/1986 | Thoenen | 267/91 |
| 4,726,572 | 2/1988 | Flesher et al. | 267/91 |
| 4,817,924 | 4/1989 | Thoenen | 267/91 |

Primary Examiner—Matthew C. Graham
Attorney, Agent, or Firm—Brown, Martin, Haller & McClain

[57] ABSTRACT

Described is a spring core for a mattress, consisting of a multiplicity of identically shaped spiral springs with in each case two end rings lying diametrically opposite each other, which change to a spring coil part arranged centered between them, whereby the end rings are shaped approximately circular and consist essentially of two assembly legs, one transition leg and one additional leg and are opened on one side, whereby the leg lying opposite the respective open side of the upper or lower end ring is bent radially outward with respect to the longitudinal axis of the spring.

9 Claims, 4 Drawing Sheets

SPRING CORE FOR A MATTRESS

BACKGROUND OF THE INVENTION

The object of the invention is a spring for use in spring cores according to the object of U.S. Pat. No. 4,817,924 going back to the same applicant. Springs of this type have proven themselves and are superior to the looped Bonnell springs because they achieve the same spring force without loops and thus require less wire.

It was observed that when a spring of that type was used, a relatively high number of springs per surface unit of a mattress body must be used because the surfaces in the area of the upper and the lower end rings of the individual springs are relatively narrow.

This means that a relatively large number of such springs must be used per surface unit of a mattress, which is associated with increased production costs and an increased cost of installation.

Furthermore, during use of the proven spring according to U.S. Pat. No. 4,817,924, it has turned out that in many cases undesirable rubbing noises have occurred when the spring arrangement is subjected to a load. This is due to the fact that the upper end ring lies practically flush with certain leg parts over the round wound spring coil part starting below it, as a result of which parts of the upper end ring strike the spring coil part lying below it when a load is applied to the spring arrangement and may generate an undesirable rubbing noise.

Furthermore, the individual support surface of the known spring can also be improved because the relatively small surfaces of the upper and lower end rings of the spring had the disadvantage that the spring moved as one whole part without resulting in tilting or twisting of the end rings for the purpose of matching to the body surface lying on top.

SUMMARY OF THE INVENTION

The invention is therefore based on the task of developing a spring according to the object of U.S. Pat. No. 4,817,924 in such a way that a substantially greater and improved support effect is provided against the surface of a body lying on top of it, whereby a smaller number of springs must be used per surface unit referred to a mattress surface.

An additional task of the invention is to provide improved individual support of the spring against a body surface having a tilted effect against the spring, which means that the respective end rings of the spring according to the invention must match the body surfaces better.

In order to solve the task posed, the invention is characterized by the features of the applicable claim 1.

An important feature of the invention is that the respective effective surface of the upper and the lower end ring of the spring is increased because at least one curved leg bent radially outward opposite the longitudinal axis of the spring is arranged at the leg of the respective upper and the lower end ring, which lies opposite the open part of the respective end ring.

With this technical model the important advantage is achieved that the effective surface of the respective end ring against a surface of a body supported on it becomes substantially greater.

As a result, for a constant spring force, on the one hand, the support surface becomes greater, and, on the other hand, because of the increased surface of the upper and lower end rings, the spring becomes more sensitive to tilting and twisting, that is, it adapts better to tilting forces of this kind.

By installing at least one curved leg of this kind, the advantage is thus achieved that the effective lever arm against tilting forces on the upper and the lower end ring of this spring is substantially improved.

An additional advantage is that, because of the larger effective support surface in the area of the upper and lower end rings of this spring, a smaller number of springs is required per surface unit of a mattress core.

Referring to a spring unit as it is known from U.S. Pat. No. 4,817,924, for the same spring density per unit surface every third spring can be saved.

For a spring core of a size of 90 cm×1.90 m, this gives a wire saving of 10% of the wire required for a customary spring core of this type.

In a preferred development of the present invention, it has been provided that the curved leg has been bent with a constant radius, whereby different possibilities are provided for obtaining such a radius.

In a first embodiment, the radius can be centered on the midpoint of the end ring.

In other embodiments, the radius is arranged eccentric to the midpoint of the end ring.

In a development of the present invention, additional curve shapes have been integrated into the curved leg, for instance, an additional smaller curved leg with a smaller radius can be arranged at the apex of the curved leg according to the invention.

Instead of the installation of a radial curved leg bent outward, other leg shapes can also be used such as, for example, a straight leg part delimited by radial sections.

By selecting different curve shapes and different leg shapes for this curved leg, it is thus possible to design the effective lever arm for this curved leg individually with respect to the end ring so that the support effect on a body lying on it can be optimized.

The spring according to the invention consists of two end rings lying opposite each other, whereby the upper end ring through suitable transition legs changes to the middle concentric spring coil part, which in turn at its bottom base part through a similar transition leg changes to the lower end.

The upper and the lower end rings are arranged mirror symmetrically with respect to the longitudinal center axis of the spring. This means that with respect to a longitudinal center axis the parts of the upper and lower end rings lie diametrically opposite each other.

For reasons of simplification, in the following description only the upper end ring will therefore be described in more detail, whereby the lower end ring exhibits the same parts exactly mirror symmetrically to the upper end ring.

Consequently, the description of the upper end ring is sufficient to also describe the lower end ring and its function.

BRIEF DESCRIPTION OF THE DRAWINGS

In the following, the invention will be described in more detail by means of drawings showing several methods of execution. Additional features essential to the invention and advantages of the invention here follow from the drawings and their description.

DESCRIPTION OF THE PREFERRED EMBODIMENT

Figure 1:
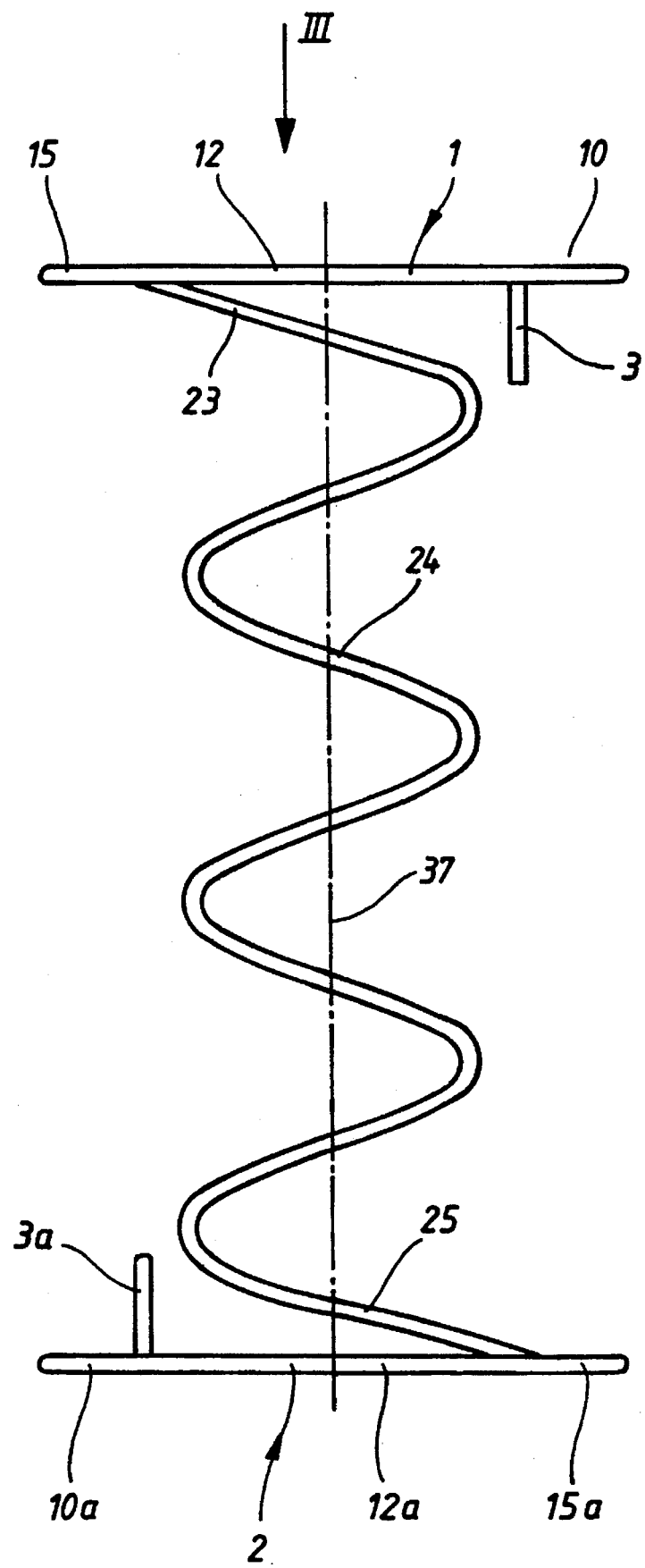
FIG. 1 shows a side view of the spring according to the invention in the direction of the arrow 1 on the spring according to FIG. 2.
Figure 2:
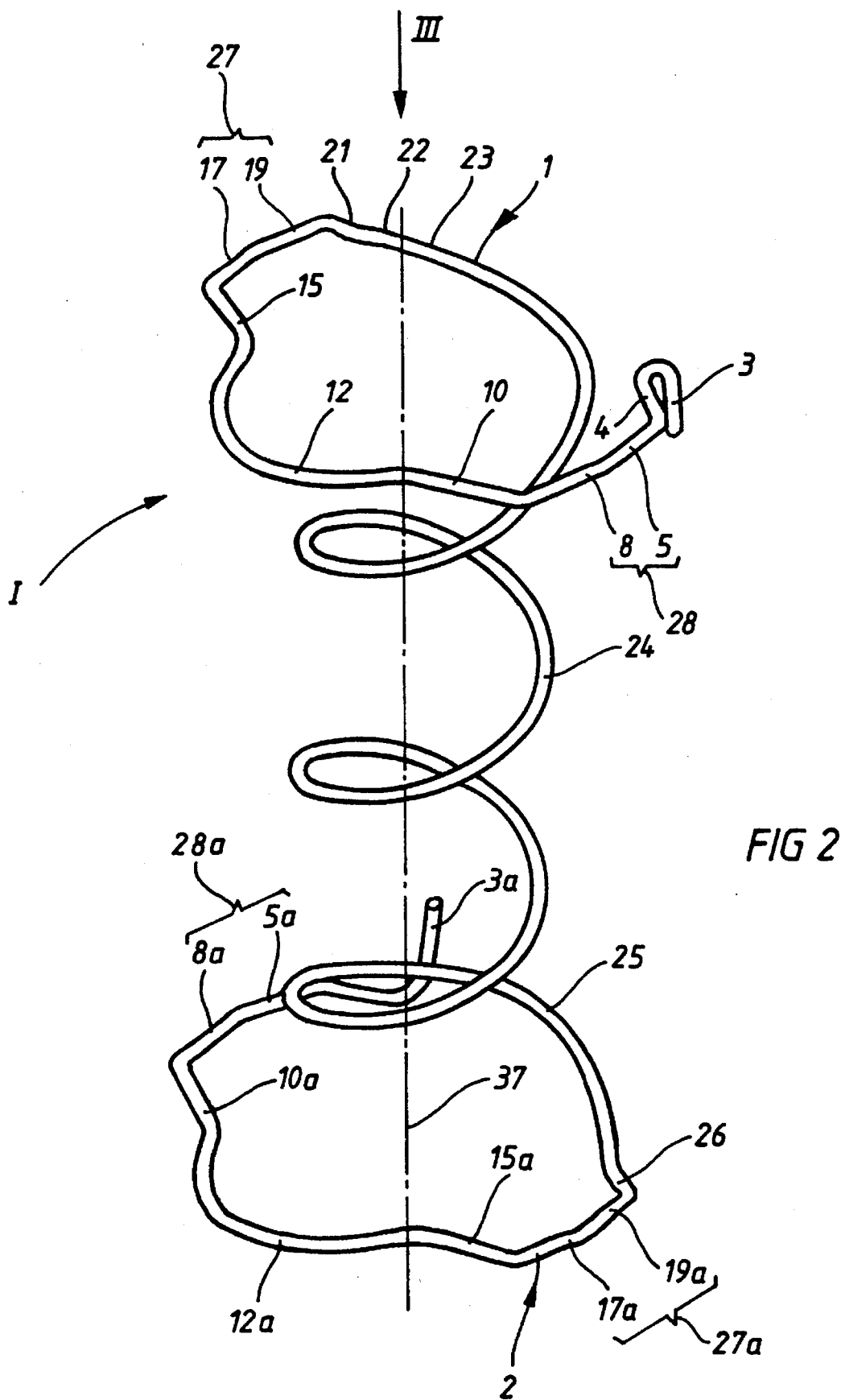
FIG. 2 shows a perspective side view of the spring.
Figure 3:
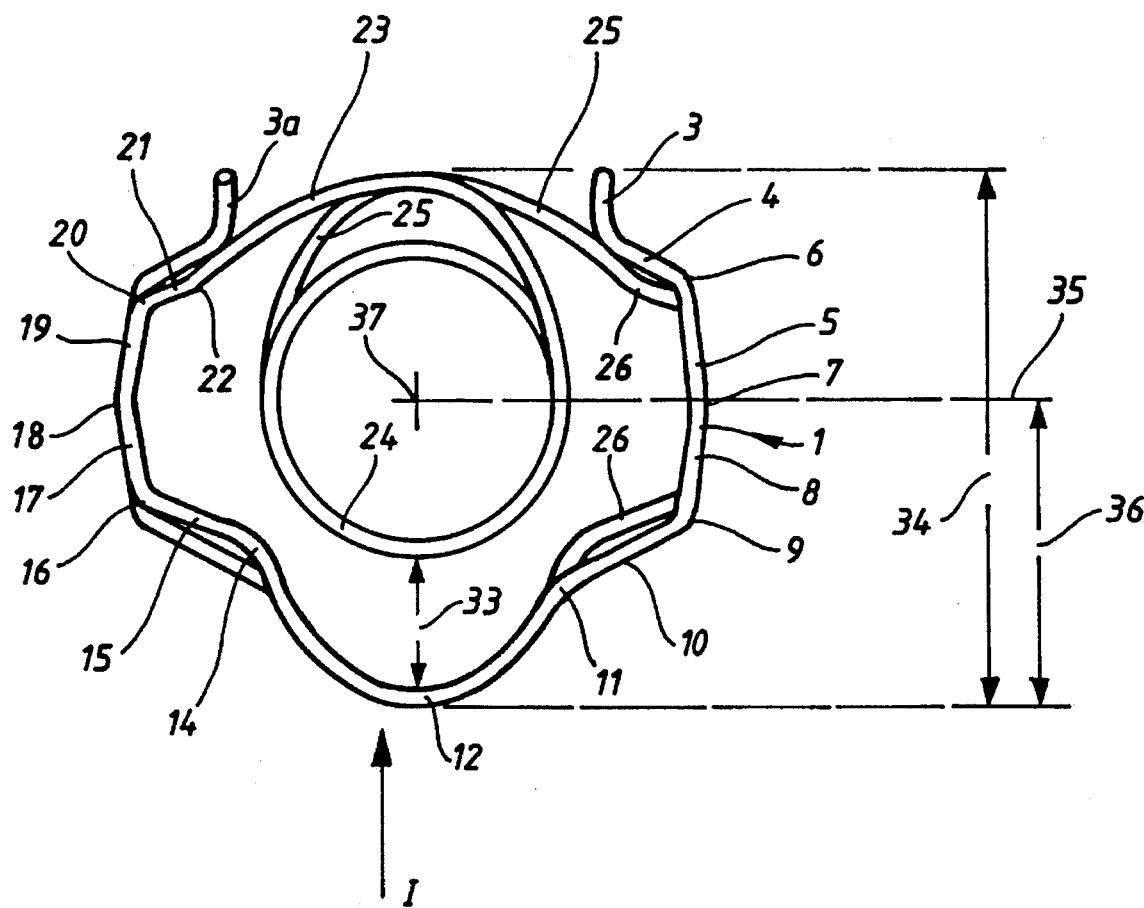
FIG. 3 shows a front view of the spring in the direction of the arrow III in FIG. 1.

The spring according to the invention consists essentially of two end rings, 1 and 2, lying diametrically opposite each other and being connected through suitable transition legs 23, 25 to a central spring coil part 24.

The spring effect of the spring is essentially provided by the central spring coil part 24.

According to the above general description, the end rings 1, 2 serve to introduce a force acting at an angle on the spring favorably and as uniformly as possible in the middle central spring coil part 24. This assumes that the surfaces of the upper and lower end rings 1, 2 also adjust optimally to body surfaces being supported at an angle.

The upper end ring 1 consists essentially of a wire end 3 bent off downward, which through a bend changes to a leg 4, which in turn through a bend 6 changes to a leg 5, which is connected to it.

The leg 5 runs through a bend 7 into a leg 8 connected to it, whereby the legs 5, 8 at a small angle to each other form an assembly leg 28 and are connected to each other through the adjacent springs through a connection spring (not shown on the drawings). With respect to the connection of individual springs, reference is made to the disclosure in U.S. Pat. No. 4,817,924, which in its complete content shall be covered by the present disclosure.

Behind leg 8 through a bend 9, an additional leg 10 has been connected, which through a bend 11 changes to the curved leg 12 according to the invention.

It is important that the curved leg 12 is at an increased distance 33 from the spring coil part 24 lying inside so that when the upper end ring 1 and consequently also the lower end ring 2 are deflected, the curved leg 12 cannot make contact with the spring coils of the spring coil part 24, which was still possible in the older U.S. Pat. No. 4,817,924.

In the practical example shown, the curved leg 12 is bent with a constant radius, and at the place lying opposite the bend 11, it passes through a bend 14 over into a leg 15.

The leg 15 in turn passes through a bend 16 into a leg 17, which passes through a bend 18 into a leg 19, which in turn passes through a bend 20 into a leg 21, which through a bend 22 passes into the upper transition leg connect to the spring coil part 24.

It is important that the bend 9 corresponds to the bend 6, that the bend 14 corresponds to the bend 11, and that the bend 16 corresponds to the bend 9.

Furthermore, the length of the leg 17 is shorter than the length of the comparable leg 8 lying opposite it, just as the length of the leg 19 is shorter than the length of the comparable leg 5.

It follows from this that both legs 17, 19 form a shorter assembly leg 27 as compared to the previously mentioned assembly leg 28.

This ensures that for adjacent springs that are connected to each other through a common connection spring, in each case a longer connection leg 28 of one spring comes into contact with a shorter connection leg 27 of the adjacent spring and both connection legs 27, 28 of adjacent springs are connected to each other through the common connection spring.

Furthermore, reference is also made to the fact that the leg 21 running into the transition leg 23 forms a bend 22 in the transition area.

The same also applies in a similar way for the lower end ring 2, where the same parts were equipped with the same numbers while adding the letter a.

The only difference is that the lower transition leg 25 runs into the lower end ring 2 through a bend 26, which corresponds to the upper bend 22.

Figure 4:
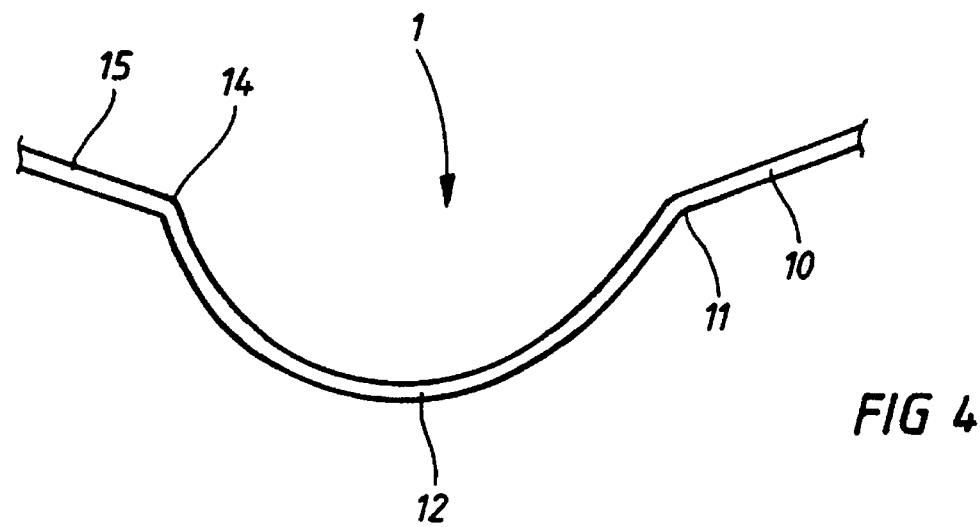
FIG. 4 shows an enlarged top view of the curved leg of the upper end ring.

By means of FIG. 4, it can consequently be seen that set off from the bend points 11 and 14 an approximately uniformly bent curved leg 12 is preferred, which ensures the previously mentioned increased distance 33 from the adjacent spring coil part 24.

This simultaneously ensures an increased lever arm 36 with reference to the center axis 35 of the spring, as a result of which the bending and tilting forces can better be taken up over the extended lever arm 36 and can be introduced into the spring winding part 24.

Altogether, the bend 12 in the curved leg 12 directed radially outward thereby also increases the effective spring width 34 substantially.

Figure 5:
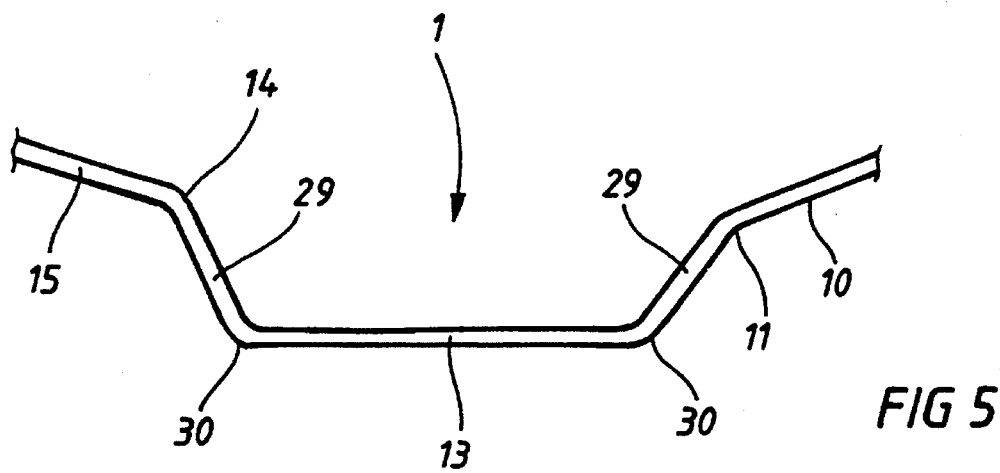
FIG. 5 shows an embodiment of a curved leg modified as compared to FIG. 4.

FIG. 5 shows, as compared to FIG. 4, a modified practical example from which it can be seen that instead of the uniformly bent curved leg 12 an approximately straight shaped leg 13 is bent radially outward and joins the legs 1 0, 15 of the respective end ring 1, 2 through the leg 29 and the associated bend 30.

Figure 6:
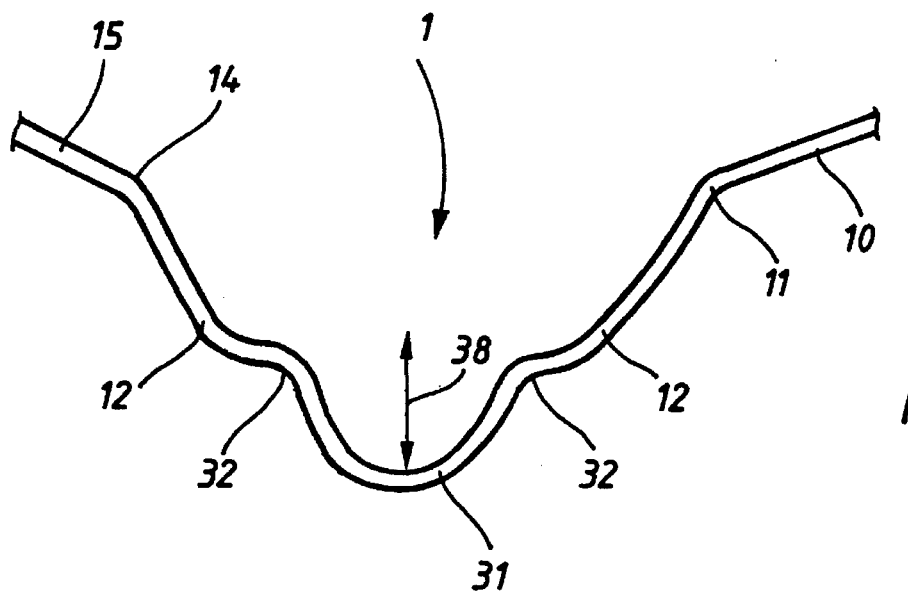
FIG. 6 shows a further modification of the curved leg as compared to FIG. 4.

FIG. 6 shows as an additional practical example that from the shape of the uniformly bent curved leg 12 a smaller curved leg 31 with a smaller radius (38) can also be bent out, which then is set off from the curved leg 12 by suitable bends 32.

It is obviously also possible to design the bent curved leg 31 as a straight leg.

Overall with the described spring the substantial advantage is achieved that a substantially larger effective spring surface is obtained in the area of the end rings 1, 2 and consequently a substantially better matching to inclined body surfaces lying on it, whereby simultaneously the use of a smaller number of springs per surface unit of a spring core is ensured. This results in lower production costs.

I claim:

1. A spring core for a mattress, comprising:

a plurality of identically shaped spiral springs, each spring comprising a central spring coil part having opposite first and second ends, a first end ring secured to the first end of the spring coil part and a second end ring secured to the second end of the spring coil part and diametrically opposite the first end ring;

each end ring being of approximately circular shape and being open on one side, and comprising first and second assembly legs adjacent the open side of the end ring, a transition leg extending between the first assembly leg and spring coil part, and an additional leg extending between said assembly legs and positioned diametrically opposite said open side of the end ring; and each of said additional legs being bent radially outwardly with respect to said spring coil part and being positioned outside the radius of said spring coil part, whereby said additional legs cannot contact said spring coil part when the core is compressed.

2. The spring core as claimed in claim 1, wherein each of said additional legs is bent in an approximately uniform radius.

3. The spring core as claimed in claim 2, wherein each end ring has a center point and the radius of each additional leg is centered approximately on the center point of the respective end ring.

4. The spring core as claimed in claim 2, wherein each end ring has a center point and the radius of each additional leg is arranged eccentric to the center point of the respective end ring.

5. The spring core as claimed in claim 1, wherein each additional leg is shaped as an approximately straight leg over most of its length.

6. The spring core as claimed in claim 1, wherein each additional leg includes a curved portion of a first radius and at least one additional curved portion having a second radius smaller than said first radius.

7. The spring core as claimed in claim 1, including at least one bend between said transition leg and said first assembly leg.

8. The spring core as claimed in claim 1, including a transition region between each pair of legs in each of said end rings, each transition region comprising a bend.

9. A spring core for a mattress comprising:

a plurality of identically shaped spiral springs, each spring comprising a central spring coil part having opposite first and second ends, a first end ring secured to the first end of the spring coil part and a second end ring secured to the second end of the spring coil part and diametrically opposite the first end ring;

each end ring being of approximately circular shape and being open on one side, and comprising first and second assembly legs adjacent the open side of the end ring, a transition leg extending between the first assembly leg and spring coil part, and an additional leg extending between said assembly legs and positioned diametrically opposite said open side of the end ring;

each of said additional legs being bent radially outwardly with respect to said spring coil part; and one of said first and second assembly legs having a length less than the length of the other of said first and second assembly legs.

\* \* \* \* \*